Jan. 9, 1940. A. VANDERKELEN 2,186,220
BACK REST
Filed Aug. 17, 1938

Inventor
A. Vanderkelen
By Clarence A. O'Brien
and Hyman Berman
Attorneys

Patented Jan. 9, 1940

2,186,220

UNITED STATES PATENT OFFICE 2,186,220

BACK REST

Alphonce Vanderkelen, Green Bay, Wis.

Application August 17, 1938, Serial No. 225,457

1 Claim. (Cl. 155—5.16)

My invention relates to improvements in back rests for use more particularly on the seats of motorcycles, although, as will presently appear, it is adapted for use in a similar capacity on other forms of seats.

The primary object of the invention is to provide a simply constructed, durable, comfortable device of the character indicated and which may be readily attached to a motorcycle seat to brace the back and thereby contribute to the comfort of the rider.

To the accomplishment of the above, and subordinate objects presently appearing, a preferred embodiment of my invention has been illustrated in the accompanying drawing, set forth in detail in the succeeding description and defined in the claim appended hereto.

Figure 1:
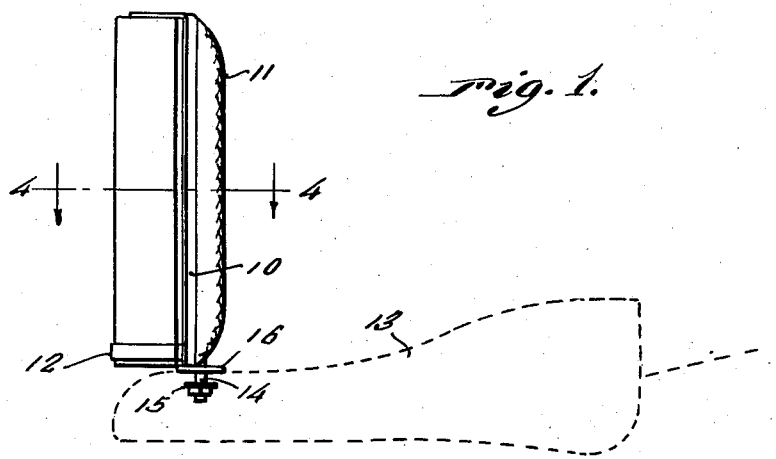
Figure 2:
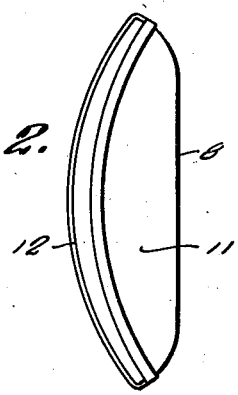
Figure 3:
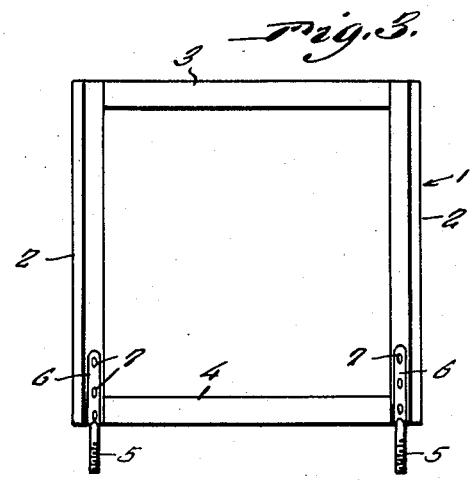
Figure 4:
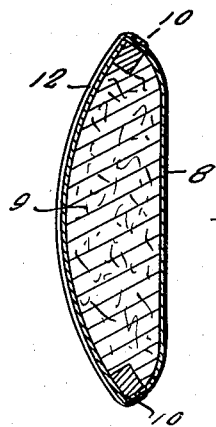

In said drawing:

Figure 1 is a view in side elevation illustrating a back rest constructed in accordance with my invention and applied to a motorcycle seat, Figure 2 is a view in top plan, Figure 3 is a view of the back rest frame in front elevation, and Figure 4 is a view in transverse section taken on the line 4—4 of Figure 1 looking in the direction indicated by the arrows.

Referring to the drawing by numerals, the back rest of my invention comprises, as its basic element, a substantially rectangular frame 1 including side bars 2, and top and bottom bars 3 and 4 respectively, said frame being arched transversely as best illustrated in Figure 4.

Extending from the lower ends of the side bars 2, preferably on the inner sides thereof, are threaded bolts 5 secured to said bars 2 by flattened extensions 6 fitting flat against said bars and secured thereto by screws, or the like, 7. Preferably the bars 2, 3 and 4 are formed of wood. The described frame 1 is covered by an envelope 8 of any suitable material, such as fabric, containing a filler or stuffing 9 of any suitable material such, for instance, as used by upholsterers. Extending along the outer side edges of the side bars 2 are reinforcing bars 10 of metal connected together at their upper ends by a preferably integral cross bar 11 extending along the upper bar 3 and curving in conformity therewith. The lower ends of the bars 10 are similarly connected by a cross bar 12 extending across the back of the lower bar 4. Preferably, the bar 12 is also integral with the bars 10. The described reinforcing bars 10, 11 and 12 are suitably secured to the bars 2, 3 and 4, respectively, by means not shown.

The described device is attached to the motorcycle, indicated by dotted lines at 13, by extending the bolts 5 through the top of said seat and threading nuts 14 on said bolts with washers 15 interposed between said nuts and the underface of the seat 13. A cross bar 16 may be interposed between the described back rest and the seat 13 with the bolts 5 extended therethrough and to provide an adequate bearing surface for clamping the rest in proper position.

The foregoing will, it is believed, suffice to impart a clear understanding of my invention without further explanation.

Manifestly, the invention as described, is susceptible of modification without departing from the inventive concept and right is herein reserved to such modifications as fall within the scope of the subjoined claim.

What I claim is:

An upholstered back rest for use on a motorcycle seat including a rectangular frame having upstanding side bars and upper and lower horizontal bars, respectively rearwardly bowed, and a one-piece strap metal frame extending flat along the outer sides of said side bars, across the top of the upper bar, and across the rear side of the lower bar, and including upper and lower bars bowed in conformity with the upper and lower frame bars.

ALPHONCE VANDERKELEN.